April 12, 1938.  H. C. CLAUSER  2,114,213
SELF EXTENSIBLE FLOAT LIGHT
Filed June 12, 1936
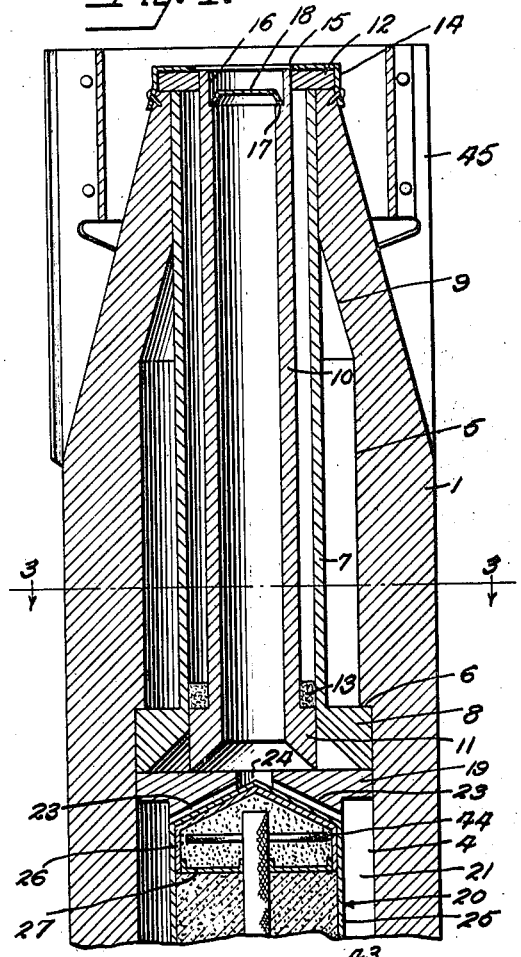
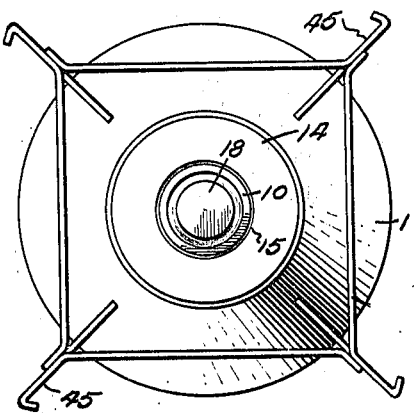
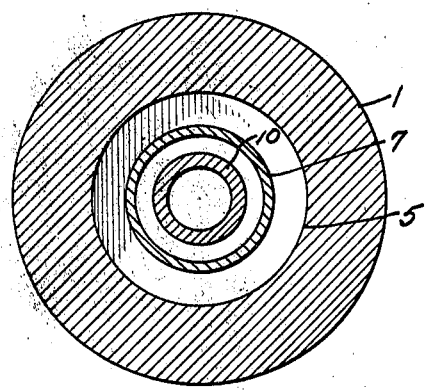
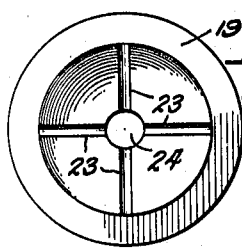
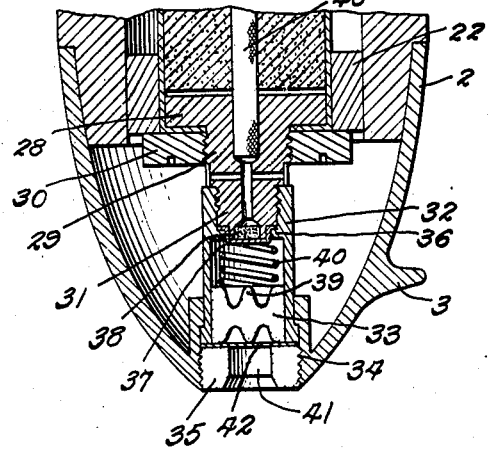
Inventor
Herbert C. Clauser
By Mason Fenwick + Lawrence
Attorneys Patented Apr. 12, 1938

2,114,213

UNITED STATES PATENT OFFICE 2,114,213

SELF-EXTENSIBLE FLOAT LIGHT

Herbert C. Clauser, Elkton, Md.

Application June 12, 1936, Serial No. 84,963

8 Claims. (Cl. 102—24)

This invention relates to float lights, which, to one skilled in the art, are floating torches constructed as buoyant casings weighted at one end adapted to be thrown from air craft contemplating landing on water, containing flame or smoke-producing chemicals which being ignited through impact of the float light with the water, produce a smoke signal by day and by night a flame which illuminates a large area revealing the conditions for landing. The general object of the invention is to provide a float light of improved construction.

The more specific objects of the invention will become apparent as the following description of a preferred embodiment proceeds.

In the drawing which accompanies and forms a part of the following specification and throughout the several figures of which the same characters of reference have been employed to denote identical parts—

Figure 1 is a longitudinal section through the float light;

Figure 2 is a top plan view;

Figure 3 is a transverse section taken along the line 3—3 of Figure 1; and

Figure 4 is a bottom plan view of the abutment plate.

Referring now in detail to the several figures, the casing consists of a buoyant body portion 1 and a heavy nose 2, the center of mass being such that the float light will float in vertical position partly submerged. The nose is preferably streamlined and is provided with a deflector 3 which causes it to describe a short trajectory upon entering the water bringing it to the surface more quickly than would be its natural return in the absence of the deflector.

In the interest of economy of manufacture the body or shell 1 is provided in its lower portion with a cylindrical bore 4 and its upper portion with a cylindrical counter-bore 5 avoiding flutes, channels and other interior differentiations all of which require special manufacturing operations.

The intersection of the bore 4 and counter-bore 5 defines an internal shoulder 6 which acts as a stop for guide tube 7. Said guide tube has an enlarged head 8 at its lower end which abuts the shoulder 6, and at its upper end the guide tube forms a snug fit with the counter-bore which due to an intermediate taper 9 is of reduced diameter. The guide tube 7 is for the purpose of guiding the pressure-actuated extension 10. Said extension has an enlarged head 11 at its lower end fitting the guide tube and its upper end passes slidably through a disk 12 which over-hangs the space between the extension 10 and guide tube 7 and forms a stop which the head 11 engages when the extension 10 is out to its fullest extent. A washer 13 of felt or other suitable material rests upon the shoulder formed above the head and intervenes between the head and the disk 12 forming a watertight seal between the extension and the top of the float light. A ferrule 14 overlies the disk 12 and attaches to the shell holding the disk 12 in position. The ferrule has a central aperture 15 large enough to clear the extension 10.

The tubular extension 10 has a rabbet 16 at its upper end forming a shoulder 17 on which seats a closure cap 18. The closure cap 18 preferably makes a merely frictional fit within the tubular extension so that after the extension has been forced out by internal gas pressure, and can come out no farther due to the engagement of washer 13 with the disk 12, further building up of the internal pressure will force the closure cap 18 out and permit the issuance of the smoke or flame.

For the sake of hermetically sealing the float light during the months in which it may be in storage or in the air craft so as to preserve the combustible material from deterioration it is preferred to coat the closure cap 18 with a film of paraffin or the like.

The lower face of the head 8 of the guide tube 7 forms a secondary shoulder against which an abutment plate or spider 19 is seated. The abutment plate is immovable in an outward direction. A cartridge 20 of combustible material rests against the abutment plate. Preferably, to keep the cartridge centered and to prevent its tilting or slipping laterally, both the upper end of the cartridge and the lower face of the abutment plate are correspondingly dished or otherwise interfitting. The cartridge 20 is smaller in diameter than the bore 4 providing an annular gas space 21. The lower portion of the cartridge is centered by means of a ring washer 22 which fits within the bore and around the cartridge.

The gas space 21 communicates with the tubular extension 10 by way of radial channels 23 formed in the lower face of the abutment plate and which converge to a central port 24 in said abutment plate.

The cartridge as shown consists of a metallic foil casing 25 having in its upper end a cap 26 containing a charge of sensitive combustible mixture employed in starting the ignition. Beneath this the cartridge is filled with a charge of the combustible which will produce the intense flame or plume of smoke. This in general is more difficultly ignitible than the starting composition which explains the necessity for using the latter. The inflammable partition 27 which may be of "celluloid" separates the starting composition from the signal or illuminating composition. In the lower part of the casing 25 is the metallic plug 28 having a threaded boss 29 receiving a nut 30. The free edge of the foil casing is bent over the plug 28 and the nut 30 screws down against it forming a tight joint.

The lower end of the boss 31 is of reduced diameter and receives a cylindrical tube 32 which functions both as a guide and as a support. It is a guide in the sense that in it slides the cylindrical striker 33 and it is a support for the cartridge holding the cap end of the same rigidly against the adjacent face of the abutment plate. The lower end of the tube 32 is seated in a conter-bore 34 in the lower end of the nose 2 and an internal nut 35 screws into the nose and against the tube 32 fixing it in position.

The tube 32 has an internal flange 36 arranged at such a depth as to contact the end 31 of the boss when the tube 32 is screwed fully into place. A dentable cap 37 which may be of metallic foil covers the end 31 of the boss and has its edges pinched between the flange 36 and the end of the boss. The cap 37 forms a hermetic seal for the lower end of the cartridge. Just above the cap and within the lower end of the cartridge is a percussion cap 38. The striker 33 has a protuberance 39 which when the striker is violently raised impinges against the dentable cap 37 and explodes the percussion cap 38. A light spring 40 normally keeps the striker separated from the dentable cap and prevents inadvertent ignition. The lower end of the nut 35 is formed with a bore 41 which is closed from the striker by means of a paper washer 42. The paper washer ruptures through impact when the float light strikes the water, the impact of the water throwing the striker 33 upward against the tension of the spring 40 causing the protuberance 39 to contact the dentable cap 37 to explode the percussion cap. A fuse 43 of the well known Bickford type extends through the cartridge into the starting cap. Said fuse is so made that it will not ignite the body of the combustible material through which it passes. Near its upper end it is provided with a quick match 44 which communicates ignition to the combustible substance within the starting cap.

The great value of having the abutment plate 19 is to hold the cartridge together in pressed relation. In the absence of said abutment plate the violence of the ignition in the starting cap and the quick evolution of gas might frequently separate the starting cap from the body of combustible mixture in the shell 25 and thus prevent the ignition of said combustible mixture. According to the construction as illustrated and described the parts of the cartridge are clamped together between the abutment plate on the one hand and the bore 32 on the other so that no separation can take place and the combustion within the starting cap is communicated by way of the "celluloid" partition 27 to the body of the chemical beneath.

Burning of the cartridge proceeds like that of a candle, the cartridge gradually burning shorter. The evolved flame and gases pass into the gas chamber 21 thence by way of the radial channels 23 through the central bore 24 and into the bore of the extension tube 10. Initially, the gases are held in by the closure cap 18 and the extension rises to its fullest extent until the washer 13 contacts the disk 12. Then the closure cap is blown out and the device performs its function either as a day or night-time signal. The fin structure 45 is provided to assure rectilinear flight of the float light when falling without wobbling or turning over.

It will be obvious to those skilled in the art that the specific details of construction as shown and described and the arrangement of parts are by way of illustration and not to be construed as limiting the scope of the invention as defined in the appended claims.

What I claim as my invention is:

1. Float light, comprising a buoyant shell having a weighty nose at one end, said shell having a large bore in the end adjacent the nose and a smaller bore opening in the opposite end and intersecting the large bore forming an annular shoulder, a cartridge, an abutment plate fixed in said large bore independent of said cartridge stopped by said shoulder and having a gas passage communicating with said smaller bore, a hollow cartridge support carried by said nose, said cartridge being clamped between said support and abutment plate, said cartridge and abutment plate being so shaped as to inter-fit, centering said cartridge, and means within said support for firing the charge by water impact.

2. Float light, comprising a buoyant shell having a weighty nose at one end, said shell having a large bore in the end adjacent the nose and a smaller bore opening in the opposite end and intersecting the large bore forming an annular shoulder, an abutment plate in said large bore stopped by said shoulder, a hollow cartridge support carried by said nose, a cartridge clamped between said support and abutment plate, said cartridge being of less diameter than said large bore providing an annular gas space around said cartridge, said abutment plate being formed with one or more gas passages establishing communication between said gas space and the smaller bore of said shell.

3. Float light, comprising a buoyant shell having a weighty nose at one end, said shell having a large bore in the end adjacent the nose and a smaller bore opening in the opposite end and intersecting the large bore forming an annular shoulder, an abutment plate in said large bore stopped by said shoulder, a hollow cartridge support carried by said nose, a cartridge clamped between said support and said abutment plate, said cartridge being of less diameter than the diameter of said large bore defining an annular gas space about said cartridge, said abutment plate being provided with gas passages establishing communication between said gas space and said smaller bore, said abutment plate and said cartridge being shaped to inter-fit for centering the upper end of said cartridge, a ring washer surrounding said cartridge and fitting the lower end of said large bore for centering the lower end of said cartridge, and means within said support for firing the cartridge by water impact.

4. Float light, comprising a buoyant shell having a weighty nose at one end, said shell having a large bore in the end adjacent the nose and a smaller bore opening in the opposite end and intersecting the large bore forming an annular shoulder, a guide tube fitting the outer end of the smaller bore and having an enlarged head seating against said shoulder, a pressure-actuated extension tube telescoping within said guide tube, said extension tube having an enlarged head, and means at the top of said float light overlying said enlarged head whereby to engage the same and act as a stop at the outer limit of extension of said extension tube.

5. Float light as claimed in claim 4 including an abutment plate in said large bore resting against an enlarged head of said guide tube, a hollow cartridge support carried by said nose, a cartridge clamped between said support and abutment plate, said cartridge being smaller in diameter than the said large bore, forming an annular gas space, said abutment plate being provided with one or more passages establishing communication between said gas space and said extension tube, and means within said support for firing the cartridge by water impact.

6. Float light as claimed in claim 4 including a closure cap critically seated within the outer end of said extension tube so as to remain positioned until said extension tube is pushed out to its limit by the initial gaseous pressure within said float light but blowing out through rise in pressure after the limit of extension of said extension tube has been reached.

7. Float light as claimed in claim 4 including a gasket around said extension tube upon a shoulder formed by the head of said extension tube forming a fluid-tight seal with said float light when said extension tube is in fully extended position.

8. Float light, comprising a buoyant shell having a weighty nose at one end, said shell being provided with a large bore in the end adjacent the nose and a smaller bore opening in the opposite end and intersecting the large bore forming an annular shoulder, an abutment plate in said large bore stopped by said shoulder, a hollow cartridge support carried by said nose, a cartridge clamped between said support and said abutment plate, said abutment plate having a gas passage in communication with said smaller bore having ramifications extending substantially across the end of said cartridge, and means within said support for firing the cartridge by water impact.

HERBERT C. CLAUSER.